United States Patent [19]

Wagenbach, Jr.

[11] Patent Number: 4,761,152

[45] Date of Patent: Aug. 2, 1988

[54] FOLDABLE POWER TAKE-OFF SHAFT SHIELD

[75] Inventor: Gerald L. Wagenbach, Jr., Willowbrook, Ill.

[73] Assignee: J. I. Case Company, Racine, Wis.

[21] Appl. No.: 50,688

[22] Filed: May 18, 1987

[51] Int. Cl.[4] .............................................. F16D 3/84
[52] U.S. Cl. ........................................ 464/176; 74/609
[58] Field of Search .................. 74/608, 609; 464/170, 464/176

[56] References Cited

U.S. PATENT DOCUMENTS

| | | | |
|---|---|---|---|
| 4,008,583 | 2/1977 | Davis | 464/176 X |
| 4,432,742 | 2/1984 | Hartman | 464/176 |
| 4,553,950 | 11/1985 | Teich | 464/176 |
| 4,665,768 | 5/1987 | Rashkovsky | 464/176 X |

*Primary Examiner*—Daniel P. Stodola
*Attorney, Agent, or Firm*—Peter N. Jansson, Ltd.

[57] ABSTRACT

A tractor power take-off shaft shield assembly having fixed side plates projecting from a tractor wall on either side of the shaft(s), a top plate hinged to the wall and sized to pivot between the side plates, and a slot in one and preferably both side plates each receiving a slot follower pivotably attached to the top plate, which is set in normal, lowered or raised position by positioning the slot follower(s). Preferred embodiments include each slot having an upper slot section angled downwardly somewhat from horizontal to support the slot follower when the tractor is not in use and cause it to automatically return the top plate to its normal position during tractor use. Some preferred embodiments include sidewalls on the top plate adjacent to the side plates.

19 Claims, 3 Drawing Sheets

FOLDABLE POWER TAKE-OFF SHAFT SHIELD

FIELD OF THE INVENTION

This invention is related generally to shields for power take-off shafts on tractors and, more particularly, to adjustable shields for tractor power take-off shafts.

BACKGROUND OF THE INVENTION

Farm tractors typically include one or two power take-off shafts extending rearwardly from a vertical wall of the tractor in a position to engage the drive shaft of a trailing implement. Safety shields are typically provided as regular equipment on such tractors to protect the operator from inadvertent contact with a rotating power take-off shaft or the portion of a drive shaft attached to the power take-off shaft.

While such shields serve the intended function, they also make the power take-off shaft or shafts less accessible to the point that they are often considered "in the way" during attachment and detachment of a trailing implement. In the prior art, there have been various attempts to make shields which may be removed or adjusted temporarily to accommodate the attachment and detachment of trailing implements. Among such shields of the prior art are those disclosed in the following U.S. patents:

U.S. Pat. No. 4,553,950 (Teich)
U.S. Pat. No. 4,442,742 (Hartman)
U.S. Pat. No. Re. 30,152 (Davis)
U.S. Pat. No. 3,733,854 (Young et al.)
U.S. Pat. No. 3,504,508 (Bornzin)
U.S. Pat. No. 3,389,763 (Meinert)
U.S. Pat. No. 2,967,432 (Du Shane et al.)
U.S. Pat. No. 2,858,680 (Harrington)
U.S. Pat. No. 2,696,089 (Heth)
U.S. Pat. No. 2,618,980 (Cook)
U.S. Pat. No. 2,410,503 (Johnson)
U.S. Pat. No. 2,443,035 (Hardy)

A number of problems and disadvantages exist with the adjustable power take-off shaft shields of the prior art. There is a tendency for operators, with many such shields, to either remove them permanently because they are considered "in the way" or to leave them adjusted to a position which is not fully protective. Unless such shields are properly returned to their protective positions, they fail, of course, to serve their intended purposes.

However, with many shields of the prior art, adjustment may be somewhat inconvenient, in some cases requiring tools which may not be at hand. Although adjustment may not be very difficult, it is easy to defer or ignore. In some cases, the adjustment of such shields may not be particularly easy to understand.

Certain power take-off shaft shields of the prior art are limited in their adjustability and in some cases get in the way of implement hitches, particularly upper members of the common three-point hitches used on many farm tractors and the like. The shields may be in position to be damaged during hitch operation.

Some other prior power take-off shaft shields are lacking in sturdiness and stability in their protective position(s). Some may tend to bend after a period of use which can cause improper operation such as binding during the movements of adjustment. Some have a top shield member which may tend to rattle excessively during tractor usage.

Power take-off shaft shields are, of course, safety features. If they operate improperly or are considered a nuisance, then they will fail in their primary function. While there have been many improvements and variations, a need for significant improvements in power take-off shaft shields remains.

OBJECTS OF THE INVENTION

It is an object of this invention to provide an improved power take-off shaft shield assembly overcoming certain problems and disadvantages of the prior art, including those mentioned.

Another object of this invention is to provide an improved power take-off shaft shield which will be accepted by tractor operators and used properly such that it will be in a protective position during tractor use.

Another object of this invention is to provide an improved shield assembly the operation of which is readily understood.

Another object of this invention is to provide an improved shield assembly which, having been raised for implement attachment, will automatically return to a protective position during tractor use.

Another object of this invention is to provide a shield assembly which is easy to operate, requiring no tools and no loosening and tightening of connector members.

Another object of this invention is to provide a shield assembly which is sufficiently adjustable to easily accommodate implement hitches, such as common three-point hitches.

Another object of this invention is to provide a shield assembly with improved sturdiness in construction.

Another object of this invention is to provide a shield assembly which is stable in its protective positions to provide reliable shielding.

These and other important objects will be apparent from the following descriptions of this invention.

SUMMARY OF THE INVENTION

This invention is an improved power take-off shaft shield assembly overcoming certain problems and deficiencies of shields of the prior art, including those mentioned above. The shield assembly is of the type on a tractor having one or more power take-off shafts protruding from a substantially vertical wall of the tractor, usually in a rearward direction.

The shield assembly of this invention includes: a pair of spaced side plates which are attached to and project from the wall, one on either side of the shaft(s); a top plate which is sized to pivot between the side plates about a hinge connecting its proximal edge to the tractor wall; a slot in at least one of the side plates or, more preferably, a pair of parallel slots, one in each of the side plates; and for each slot a slot follower member which is pivotably attached to the top plate and has an upright member extending below the top plate and a slot-engaging lateral portion.

The side plates are sturdy members in fixed position with respect to the tractor, while the slots and slot followers determine the position of adjustment of the top plate. Each slot includes a pair of generally upright slot sections and an upper slot section connecting the upper ends of the upright slot sections. The upright slot sections have closed lower ends which form the two ends of the slot.

The pair of generally upright slot sections of each slot include a shorter upright slot section and a longer upright slot section. The closed lower end of the shorter upright slot section is positioned to support the top plate, through the slot follower member and its lateral portion, in a normal, generally horizontal position. The closed lower end of the longer upright slot section is positioned to support the top plate, through the slot follower member and its lateral portion, in a lowered position in which the top plate is angled downwardly with respect to the wall.

The upper slot section is formed along its lower edge by a support edge positioned to support the top plate, through the slot follower member and its lateral portion, in a raised orientation in which the top plate is angled upwardly from the wall so that easy access to the power take-off shaft(s) is provided.

In certain highly preferred embodiments, the support edge which forms the lower edge of the upper section of the slot is angled downwardly somewhat from horizontal in a direction toward the shorter upright slot section. The angling of such support edge is such that the slot follower member, after it has been placed on the support edge, will remain there when the tractor is not in use, but will travel along such support edge and fall into the shorter upright slot when the tractor is in use by virtue of the vibrations and/or bumps of normal tractor use.

In this way, the adjustable top plate will automatically be returned to its normal horizontal protective position. A preferred angling of the support edge is in excess of about five degrees to horizontal, but many variations are possible.

In preferred embodiments, the shorter upright slot section is closer to the tractor wall than the longer upright slot section, and the support edge is angled slightly downwardly in a direction toward the tractor wall. The longer upright slot curves inwardly toward its lower end such that its lower end is at least as close or closer to the wall than the lower end of the shorter upright slot section. Thus, the angles of the slot follower members need not vary greatly in their positions of rest against the lower ends.

It is preferred to locate the pivot attachments of the slot follower members to the top plate directly above the support edges so that the slot follower members are vertical when resting on their respective support edges when the top plate is in the raised position. This arrangement provides both good stability in the raised position and good automatic movement to the normal position during usage with the preferred upper slot section angling referred to above.

In certain preferred embodiments, the slot follower members are formed of a substantially U-shaped bar having substantially parallel legs forming the upright members thereof and a transverse portion which is pivotably attached to the top plate. The transverse portion of the U-shaped bar is attached to the top plate along its distal edge, that is, the top plate edge which is opposite and substantially parallel to the proximal hinged edge.

In certain highly preferred embodiments, the top plate has, along its opposite lateral edges, a pair of sidewalls which extend downwardly to bottom edges above the slot-engaging lateral portions of the slot follower members. These sidewalls extend between the upright members of the slot followers and are preferably substantially parallel to the side plates. Such sidewalls serve to prevent hand placement between the side plates and the top plate when the top plate is in the raised position, and thus protect against possible hand injury.

DETAILED DESCRIPTION OF PREFERRED EMBODIMENTS

Figure 1:
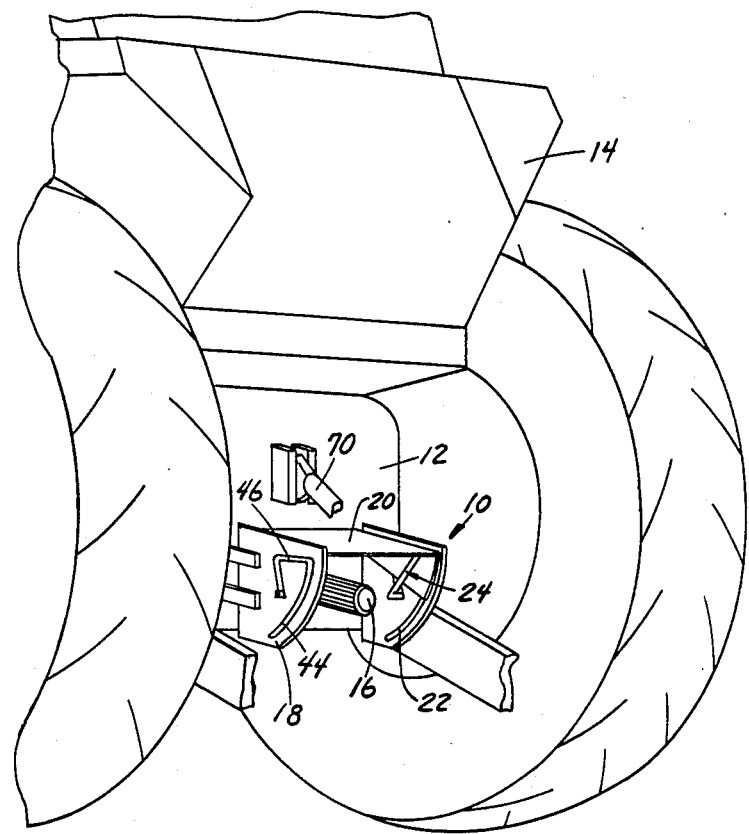
FIG. 1 is a fragmentary perspective view of the rear end of a tractor having a preferred power take-off shaft shield assembly in accordance with this invention.
Figure 3:
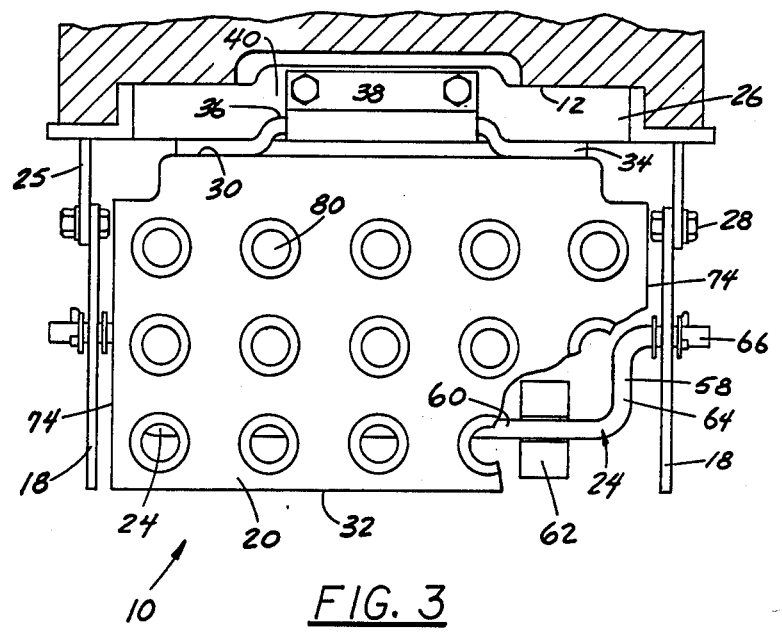
FIG. 3 is a top plan view of FIG. 2.
Figure 2:
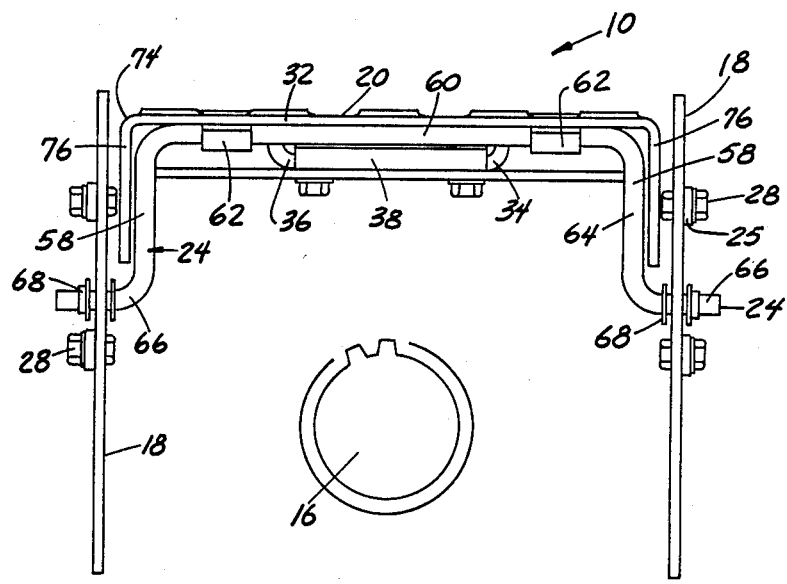
FIG. 2 is an enlarged fragmentary front elevation of FIG. 1, illustrating only the shield assembly of this invention and the end of the power take-off shaft.
Figure 4:
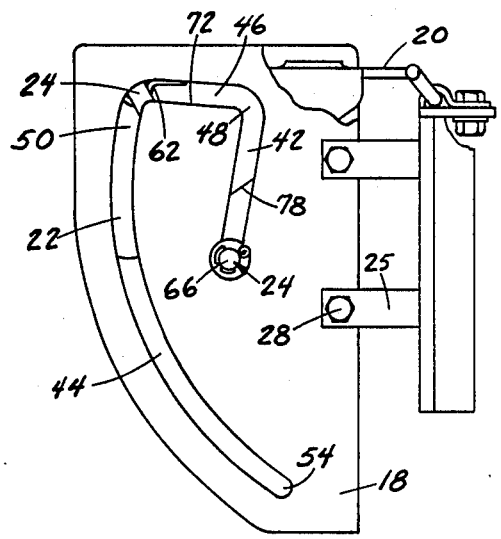
FIG. 4 is a right side elevation of FIG. 2.
Figure 6:
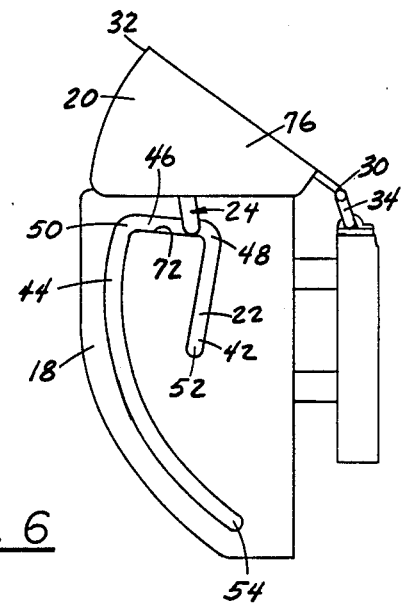
FIGS. 5-7 are reduced schematic views with one side plate removed for clarity, illustrating the normal, raised, and lowered positions of the shield top plate, respectively.
Figure 5:
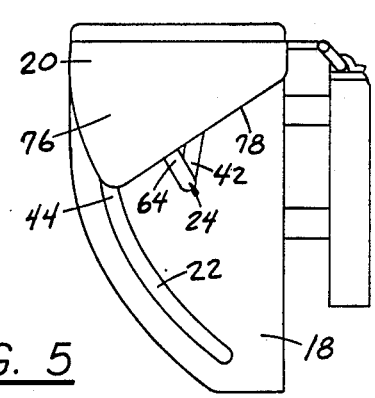
Figure 7:
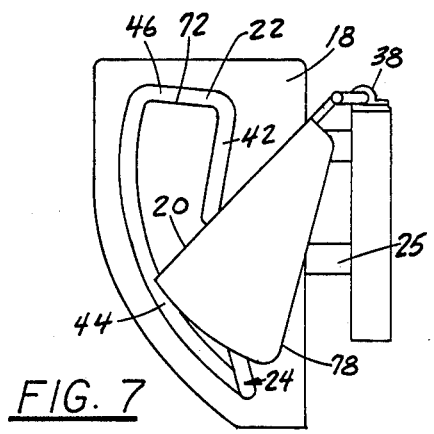

The figures illustrated a preferred power take-off shaft shield assembly 10 attached to a vertical wall 12 of a tractor 14. Shield assembly 10 surrounds a power take-off shaft 16 which protrudes from vertical wall 12. Some tractors have a single power take-off shaft, while others have a pair of power take-off shafts in vertical alignment. The power take off shaft shield of this invention may be used in either situation.

Shield assembly 10 includes a pair of spaced side plates 18, one on either side of power take-off shaft 16, a top plate 20 which is independent of side plates 18 and is dimensioned to fit and pivot between side plates 18, and slots 22 and slot follower members 24 which serve to control the position of top plate 20.

Side plates 18 are each secured to vertical wall 12 through connection to the side portions 25 of mounting brackets 26, which are bolted (bolts not shown) to vertical wall 12. Side plates 18 are themselves bolted to side portions 25 by bolts 28.

Top plate 20 has parallel proximal and distal edges 30 and 32. A pivot bar 34 is welded to proximal edge 30 and has a center portion 36 spaced from proximal edge 30 and pivotably attached to a hinge member 38 which is secured to a middle portion 40 of mounting bracket 26. In this manner, top plate 20 is hinged to vertical wall 12, such that it may be raised and lowered as hereafter described.

Each slot 22 has a pair of generally upright slot sections 42 and 44 and an upper slot section 46 connecting their upper ends 48 and 50. One of the upright slot sections is a shorter upright section 42 and the other is a longer upright slot section 44. Upright slot sections 42 and 44 have closed lower ends 52 and 54, respectively. Slots 22 are parallel and they are of equal and constant widths along their lengths such that follower members 24 can move along the entire lengths of slots 22.

Slot follower members 24 are formed of a substantially U-shaped bar below top plate 20. U-shaped bar 24 has a pair of parallel legs 58 and a transverse portion 60. Transverse portion 60 is pivotably secured to the lower surface of top plate 20 by pivot retainers 62 which are secured to top plate 20. In this manner U-shaped bar 24 is pivotably attached to distal edge 32 of top plate 20.

Each of the parallel legs 58 of U-shaped member 56 forms portions of one of the slot follower members 24, including an upright portion 64 which extends below top plate 20 and a slot-engaging lateral portion 66. Lateral portions 66 are sized to move freely in slots 22. Retainer members 68 are secured to lateral portions 66 to assure that U-shaped bar 24 remains in proper alignment.

As slot-engaging lateral portions 66 are moved within their slots 22, top plate 20 is raised and lowered and vice versa. The slots 22, the follower members 24, and the position of their attachment to top plate 20 are configured and arranged to set the possible positions of top plate 20.

The location of each slot-engaging lateral portion 66 in its slot 22 sets top plate 20 in one of three possible positions: a normal protective position in which top plate 20 is generally horizontal; a raised position in which top plate 20 is angled upwardly from tractor wall 12 to provide easy access to power take-off shaft 16 for attachment or detachment of an implement; or a lowered position in which top plate 20 is angled downwardly from vertical wall 12, still shielding power take-off shaft 16 but in a position which accommodates the lowering of an upper implement hitch member 70 secured to tractor 14 above shield assembly 10.

Upper slot sections 46 ar formed along their lower edges by support edges 72 which ar angled downwardly somewhat from horizontal in a direction toward shorter upright slot sections 42. The angling of support edges 72, and thus of upper slot sections 46, is such that slot follower members 24 (lateral portions 66) will remain on support edges 72 when tractor 14 is not in use but will travel along support edges 72 and fall into short upright slot sections 42 by virtue of the vibrations and/or bumps of normal tractor use. Thus, if top plate 20 has been moved to its raised position but not returned to its normal position, it will automatically return to its normal position quickly as slot follower members 24 drop into shorter upright slot sections 42.

It has been found that angling support edge 72 somewhat in excess of about five degrees below horizontal is desirable, although other angles and configurations are acceptable depending upon the ease with which slot follower members 24 move in upper slot sections 46. In some cases, small detents may be placed alon support edges 72 to help locate slot-engaging lateral portions 66 at an appropriate position for the raised position of top plate 20. Automatic return of top plate 20 to its normal horizontal position may still be possible depending on many factors, including the size of such detents. Flat support edges 72 are highly preferred.

In highly preferred embodiments the location of slots 22 and the positioning of the pivot attachments of slot follower members 24 to top plate 20 are such that the pivot attachments are directly above support edges 72. This facilitates the support of top plate 20 in its raised position. However, many variations in the positioning of slot follower members 24 and slots 22 are possible.

As previously noted, side plates 18 are in fixed positions with respect to tractor 14 and are spaced sufficiently from one another so that the opposite edges 74 of top plate 20 are each between the side plates and immediately adjacent to one of the side plates 18. In highly preferred embodiments, top plate 20 has a pair of sidewalls 76 extending downwardly from opposite edges 74 parallel to side plates 18 between side plates 18 and the adjacent upright members 64 of slot follower members 24.

Sidewalls 76 are integral with top plate 20. Sidewalls 76 have bottom edges 78 which, for all positions of top plate 20, are above slot-engaging lateral portions 66 of slot follower members 24. Sidewalls 76 shield against hand placement between side plates 18 and top plate 20 when top plate 20 is in its raised position. This protects against possible injury during the lowering of top plate 20.

While the preferred embodiments have slots in both of the side plates 20 and slot followers for each, a single slot with a single slot follower is possible. The use of a pair of slots and slot followers is preferred, however, for improved sturdiness.

Top plate 20, side plates 18, and slot follower members 24 are of sufficient strength such that a tractor operator may stand on top plate 20. Indeed, top plate 20 has holes 80 which provide traction edges to avoid slipping when top plate 26 is used for this purpose.

Shield assembly 10 is preferably made using steel plating and components, or other readily available materials and parts. Shield assembly 10 may be made readily by those skilled in the art who are familiar with this invention.

While the principles of this invention have been described in connection with specific embodiments, it should be understood clearly that these descriptions are made only by way of example and are not intended to limit the scope of the invention.

What is claimed:

1. A power take-off shaft shield assembly of the type on a tractor with at least one power take-off shaft protruding from a substantially vertical wall of the tractor, comprising:
   a pair of spaced side plates attached to and projecting from the wall, one on either side of the at least one shaft;
   a top plate having a substantially horizontal proximal edge hinged to the wall, the top plate dimensioned to pivot between the side plates;
   a slot in at least one of the side plates, including a pair of generally upright slot sections and an upright slot sections having closed lower ends; and
   a slot follower member pivotably attached to the top plate and having at least one upright member extending below the top plate, each with a slot-engaging lateral portion secured thereto.

2. The power take-off shaft shield assembly of claim 1 including a pair of the slots, one in each side plate, and a pair of the upright members, one for each of said slots.

3. The power take-off shaft shield assembly of claim 1 wherein the pair of generally upright slot sections include:
   a shorter upright slot section, the closed lower end of which is positioned to support the top plate, through the slot follower member and its lateral portion, in a normal, generally horizontal position; and
   a longer upright slot section, the closed lower end of which is positioned to support the top plate, through the slot follower member and its lateral portion, in a lowered position angled downwardly from the wall.

4. The power take-off shaft shield assembly of claim 3 wherein the upper slot section is formed along its lower edge by a support edge positioned to support the top plate, through the slot follower member and its lateral portion, in a raised position angled upwardly from the wall whereby easy access to the at least one power take-off shaft is provided.

5. The power take-off shaft shield assembly of claim 3 wherein the upper slot section is formed along its lower edge by a support edge angled downwardly somewhat from horizontal in a direction toward the shorter upright slot section, such that the slot follower member, having been placed on the support edge, will remain there when the tractor is not in use but will travel thereacross and fall into the shorter upright slot by virtue of the vibrations and/or bumps of normal tractor use, thereby automatically returning the top plate to its normal position.

6. The power take-off shaft shield assembly of claim 5 wherein the support edge is angled in excess of five degrees to horizontal.

7. The power take-off shaft shield assembly of claim 3 wherein the upper end of the shorter upright slot section is closer to the wall than the upper end of the longer upright slot section.

8. The power take-off shaft shield assembly of claim 7 including a pair of the slots, one in each side plate, and a pair of the upright members, one for each of said slots.

9. The power take-off shaft shield assembly of claim 8 wherein the slots are substantially parallel to each other.

10. The power take-off shaft shield assembly of claim 9 wherein the upper slot sections are formed along their lower edges by support edges positioned to support the top plate, through the slot follower members and their lateral portions, in a raised position angled upwardly from the wall whereby easy access to the at least one power take-off shaft is provided.

11. The power take-off shaft shield assembly of claim 9 wherein the upper slot sections are formed along their lower edges by support edges angled downwardly somewhat from horizontal in a direction toward the shorter upright slot sections, such that the slot follower members, having been placed on the support edges, will remain there when the tractor is not in use but will travel thereacross and fall into the shorter upright slots by virtue of the vibrations and/or bumps of normal tractor use, thereby automatically returning the top plate to its normal position.

12. The power take-off shaft shield assembly of claim 11 wherein the support edges are angled in excess of five degrees to horizontal.

13. The power take-off shaft shield assembly of claim 12 wherein the pivotable attachment of the slot follower members to the top plate are positioned on the top plate directly above the support edges such that the slot follower members are vertical when on their support edges.

14. The power take-off shaft shield assembly of claim 13 comprising a substantially U-shaped bar having substantially parallel legs forming the pair of upright members thereof and a transverse portion therebetween pivotably attached to the top plate.

15. The power take-off shaft shield of claim 14 wherein the top plate has a distal edge opposite and substantially parallel to the proximal edge and the transverse portion is attached to the top plate along the distal edge.

16. The power take-off shaft shield of claim 1 further comprising:

the spaced side plates being in fixed positions;

the top plate having opposite edges each adjacent to one of the side plates and a pair of sidewalls extending downwardly from the opposite edges to botton edges above the slot-engaging lateral portion of the slot follower member, thereby shielding against hand placement between the side plates and the top plate when the top plate is in the raised position.

17. The power take-off shaft shield assembly of claim 16 including a pair of the slots, one in each side plate, and a pair of the upright members, one for each of said slots.

18. The power take-off shaft shield assembly of claim 17 comprising a substantially U-shaped bar having substantially parallel legs forming the pair of upright members thereof and a transverse portion therebetween pivotably attached to the top plate.

19. The power take-off shaft shield assembly of claim 18 wherein the top plate has a distal edge opposite and sustantially parallel to the proximal edge and the tansverse portion is attached to the top plate along the distal edge.

* * * * *

UNITED STATES PATENT AND TRADEMARK OFFICE
CERTIFICATE OF CORRECTION

PATENT NO.   : 4,761,152
DATED        : August 2, 1988
INVENTOR(S)  : Gerald L. Wagenbach, Jr.

It is certified that error appears in the above-identified patent and that said Letters Patent is hereby corrected as shown below:

In column 4, line 18, change "illustrated" to --illustrate--.

In column 5, line 19, change "ar" to --are--.

In column 5, line 20, change "ar" to --are--.

In column 5, line 38, change "alon" to --along--.

In column 6, line 35, after "an", add --upper slot section connecting their upper ends, the--.

In column 8, lines 38 and 39, change "tansverse" to --transverse--.

Signed and Sealed this

Twenty-ninth Day of November, 1988

*Attest:*

DONALD J. QUIGG

*Attesting Officer*   *Commissioner of Patents and Trademarks*